United States Patent
Richard et al.

(10) Patent No.: US 10,197,165 B1
(45) Date of Patent: Feb. 5, 2019

(54) COLD INSTALLATION OF ELASTOMERIC VALVE SEAT

(71) Applicant: The United States of America as Represented by the Administrator of the National Aeronautics and Space Administration, Washington, DC (US)

(72) Inventors: James A. Richard, Grant, AL (US); Brad M. Addona, Toney, AL (US)

(73) Assignee: The United States of America as Represented by the Administrator of NASA, Washington, DC (US)

(*) Notice: Subject to any disclaimer, the term of this patent is extended or adjusted under 35 U.S.C. 154(b) by 419 days.

(21) Appl. No.: 15/014,615

(22) Filed: Feb. 3, 2016

(51) Int. Cl.
*F16K 1/34* (2006.01)

(52) U.S. Cl.
CPC ....................................... *F16K 1/34* (2013.01)

(58) Field of Classification Search
CPC ......................................................... F16K 1/34
See application file for complete search history.

(56) References Cited

U.S. PATENT DOCUMENTS

| | | | |
|---|---|---|---|
| 3,512,789 | A | 5/1970 | Tanner |
| 4,967,458 | A | 11/1990 | Rosenberg et al. |
| 5,538,615 | A | 7/1996 | Palumbo et al. |
| 5,620,187 | A | 4/1997 | Jia |
| 5,628,517 | A | 5/1997 | Jia |
| 6,352,232 | B1 | 3/2002 | Yorwarth |
| 7,174,806 | B2 | 2/2007 | Brackett et al. |
| 2008/0005887 | A1 | 1/2008 | Glenn et al. |
| 2012/0085375 | A1 | 4/2012 | Laukka |
| 2013/0061827 | A1 | 3/2013 | Moonen |

*Primary Examiner* — Moshe Wilensky
(74) *Attorney, Agent, or Firm* — James J. McGroary; Mark P. Dvorscak

(57) ABSTRACT

A method is provided for installing a valve seat in the hole of a valve element. The valve seat is fabricated from a seal material having a freezing temperature. The seal material is stretched such that a portion thereof has a reduced diameter that is less than the diameter of the valve element's hole. The stretched portion of the seal material is immersed in a first environment having a temperature that is less than the freezing temperature of the seal material to thereby freeze the stretched portion and fix its reduced diameter. The stretched and frozen portion is then placed in the valve element's hole with the combination then being placed in a second environment having a temperature that is greater than the freezing temperature of the seal material.

20 Claims, 3 Drawing Sheets

COLD INSTALLATION OF ELASTOMERIC VALVE SEAT

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to installing a valve seat. More specifically, the invention is method for the cold installation of an elastomeric valve seat in a valve element.

2. Description of the Related Art

Conventional elastomeric valve seat installation methods result in inconsistent seat material stresses. Typically, such installations utilize a plug or puck of elastomeric seat material that is placed or pressed into a hollow cavity of a valve element. The outer edges of that cavity are then swaged over to constrain the plug/puck. A variety of tools and method have been employed in attempts to load the plug/puck evenly and provide positive restraint. However, the results have been mixed. Sometimes the swaging process is too loose and the plug/puck is rejected under high differential pressure. Other times the swage is too tight causing cuts in the seal material or non-uniform stresses in the seal material thereby negatively impacting the integrity of the seal that is to be provided by the seal material.

SUMMARY OF THE INVENTION

Accordingly, it is an object of the present invention to provide a method of installing a valve seat.

Another object of the present invention is to provide a method of installing an elastomeric valve seat that results in self-retained and uniformly stressed valve seat.

Other objects and advantages of the present invention will become more obvious hereinafter in the specification and drawings.

In accordance with the present invention, a method is provided for installing a valve seat in a valve element having a hole defined in a surface of the valve element. The valve seat is fabricated from a seal material having a freezing temperature. The seal material is stretched such that a portion thereof has a reduced diameter that is less than the diameter of the valve element's hole. The stretched portion of the seal material is immersed in a first environment having a temperature that is less than the freezing temperature of the seal material. As a result of such immersion, the reduced diameter of the stretched portion is fixed in the first environment. The stretched and frozen portion is then placed in the valve element's hole with the combination then being placed in a second environment having a temperature that is greater than the freezing temperature of the seal material.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 4A:
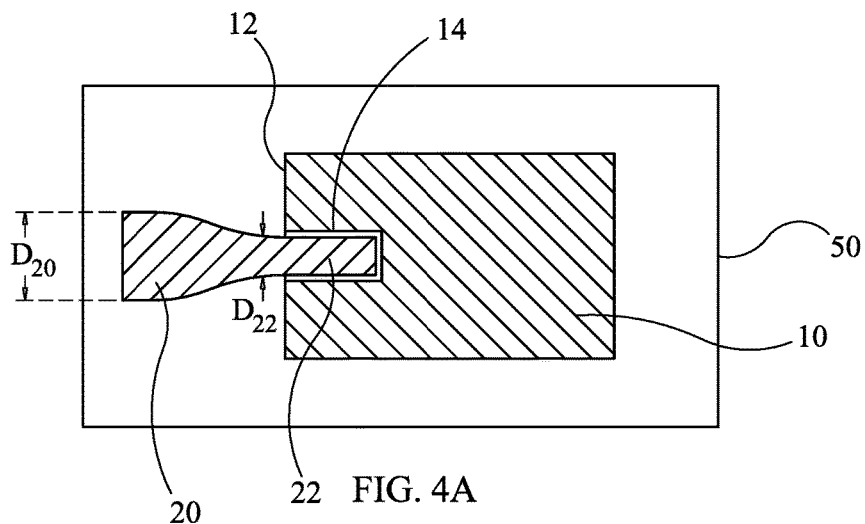
FIG. 4A is a cross-sectional view of the valve element with a portion of the frozen seal material installed therein in the freezing environment in accordance with an embodiment of the present invention.
Figure 4B:
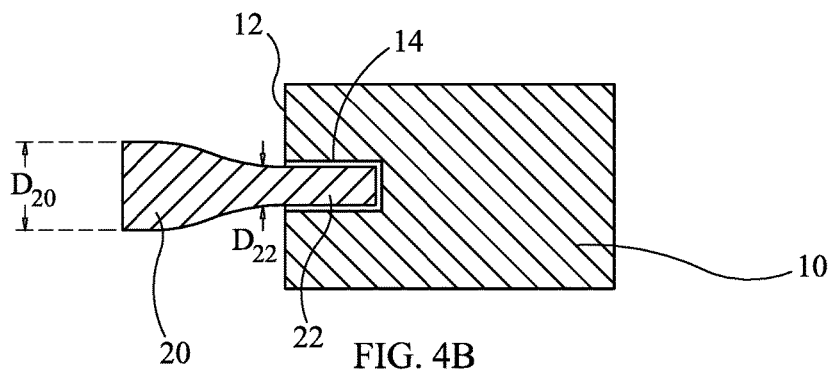
Figure 5:
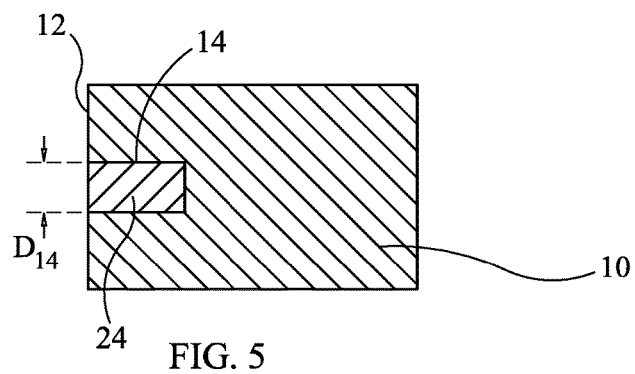

FIG. 4B is a cross-sectional view of the valve element immediately after a portion of the frozen seal material has been installed therein in an environment whose temperature is warmer than that of the seal material's freezing temperature in accordance with another embodiment of the present invention; and FIG. 5 is a cross-sectional view of the valve element with the seal material expanded to fully fill the hole in the valve element and trimmed even with the surface of the valve element.

DESCRIPTION OF THE PREFERRED EMBODIMENT(S)

Figure 1:
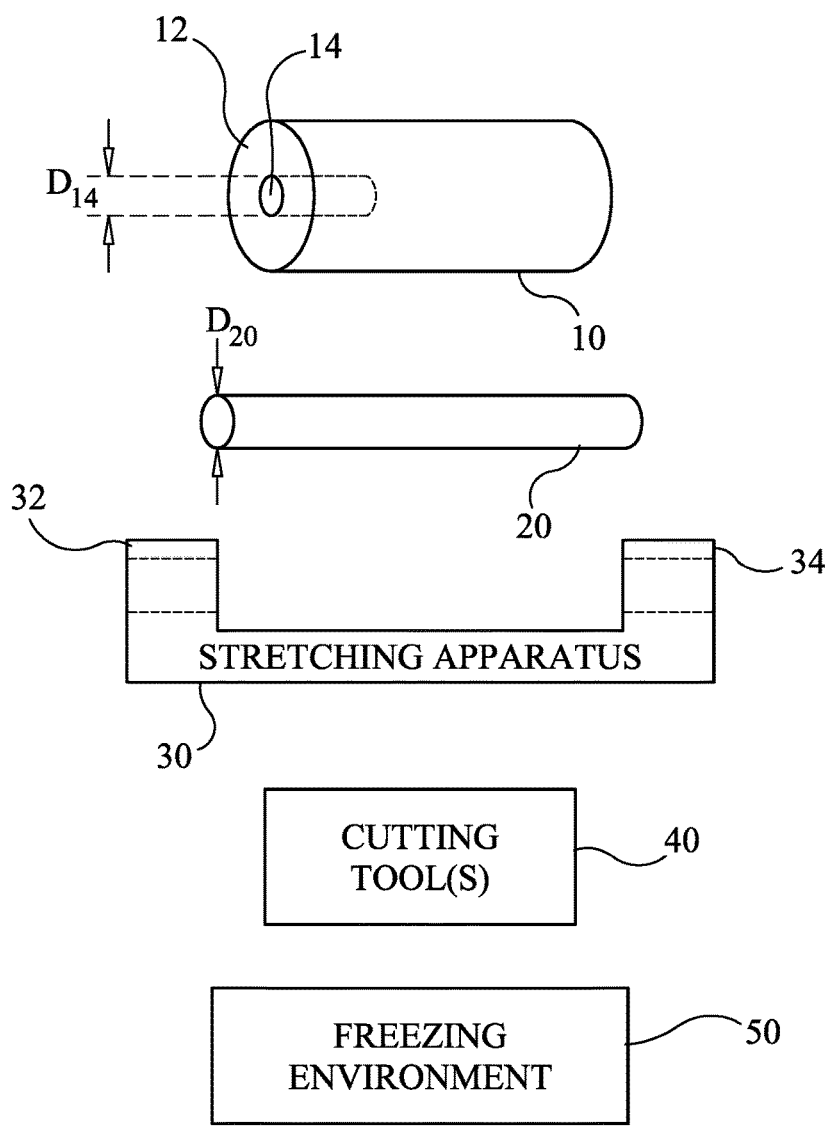
FIG. 1 is a schematic view of the materials and tools used to carry out a method of installing a valve seat in accordance with an embodiment of the present invention.

Referring now to the drawings and more particularly to FIG. 1, the work pieces and tools used to carry out a method of installing a valve seat in accordance with the present invention are illustrated schematically. The work pieces include a valve element 10 and a piece of seal material 20. The tools include a stretching apparatus 30, one or more cutting tools 40, and a freezing environment 50. Examples of the various work pieces and tools will be provided in the description to follow. However, it is to be understood that the method of the present invention is not limited to the specific examples.

Valve element 10 is typically a rigid structure (e.g., metal) that forms a moving or stationary portion of a valve construction (not shown). Valve element 10 includes a flat surface 12 and a hole 14 defined in valve element 10 with hole 14 being open at surface 12. In the illustrated example, hole 14 is a cylindrical hole having a diameter $D_{14}$. When used in a valve construction, a seal material must be installed and retained in hole 14 with the seal material terminating at surface 12. In general, the seal material is a flexible material (e.g., an elastomeric material) that will seal against another rigid element (not shown) of the valve in which valve element 10 is installed. It is to be understood that the particular configuration/size of valve element 10 to include its surface 12 and hole 14 are not limitations of the present invention.

The piece of seal material 20 is a flexible seal material that can be selected from the various materials listed above. In general, seal material 20 is in the form of a solid elongate structure. For example, if hole 14 is a cylindrical hole as shown, seal material 20 can be a solid cylinder having a diameter $D_{20}$ when seal material 20 is in its free-state condition (i.e., unencumbered) in an environment whose temperature is greater than the freezing temperature than that of the material used for seal material 20. For example, for elastomeric seal materials, a room temperature (air)

environment can provide a temperature that is greater than the freezing temperature of the seal material. In general, diameter $D_{14}$ of hole 14 is less than diameter $D_{20}$ of seal material 20 in its free-state condition. For example, in some test cases, diameter $D_{14}$ is on the order of 25% less than diameter $D_{20}$. However, it is to be understood that the amount by which diameter $D_{14}$ was smaller can be unique for each application due to differences in the forces trying to displace the seal from hole 14 (e.g., spring force, pressure force, etc.). These forces need to be considered to ensure a proper seal compression (generated by the difference between $D_{14}$ and $D_{20}$) to generate sufficient frictional forces to prevent the seal from displacing in its installed position.

Stretching apparatus 30 is any piece of equipment, or combination of pieces of equipment, that can be used to stretch seal material 20 from its free-state condition (in an environment whose temperature is greater than the freezing temperature of seal material 20) to a stretched state to thereby decrease the diameter of the stretched portion as compared to the free-state condition diameter $D_{20}$. For purpose of the present invention, the diameter of the stretched portion should be approximately 35-50% smaller than the free-state condition diameter $D_{20}$ and smaller than the diameter $D_{14}$ of hole 14. Stretching apparatus 30 typically includes clamps 32 and 34 for clamping onto seal material 20 in a stretched state as will be explained further below.

Cutting tool(s) 40 include one or more knives, scissors, or other cutting implements used to cut through the seal material during one or more phases of the installation process of the present invention. The particular type, design, and number of tools 40 can be varied without departing from the scope of the present invention.

Freezing environment 50 is any cold environment capable of rapidly decreasing the temperature of objects placed therein. For purposes of the present invention, the temperature in freezing environment 50 should be less than the freezing temperature of seal material 20. In general, freezing environment 50 is a fluid environment such that objects can be immersed therein. To expedite the transfer of temperature to objects immersed therein, freezing environment 50 can be a cryogenic liquid such as liquid nitrogen. However, it is to be understood that other cryogenic liquids such as liquid helium and liquid hydrogen could also be used without departing form the scope of the present invention.

Figure 2:
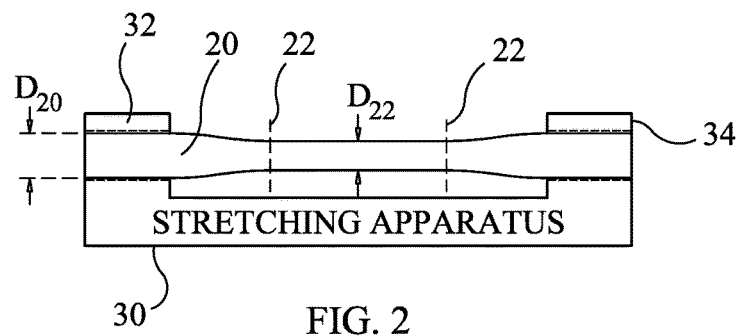
FIG. 2 is a schematic view of the stretching apparatus with the elongate piece of seal material held and stretched thereby.

Referring now to FIG. 2, a first step in the present invention is to stretch seal material 20 in stretching apparatus 30 in order to generate a stretched, reduced diameter portion indicated by the portion of seal material 20 between dashed lines 22. More specifically and by way of an illustrative example, one end of seal material 20 is clamped by clamp 32, seal material 20 is stretched to create reduced diameter portion 22, and the other end of seal material 20 is clamped by clamp 34. These process steps are accomplished in an environment (e.g., a room temperature environment) whose temperature is greater than the freezing temperature of seal material 20 thereby allowing the creation of reduced diameter portion 22. As mentioned above, the diameter $D_{22}$ of reduced diameter portion 22 is smaller than diameter $D_{14}$ of hole 14 and approximately 35-50% smaller than the free-state condition diameter $D_{20}$ of seal material 20.

Figure 3:
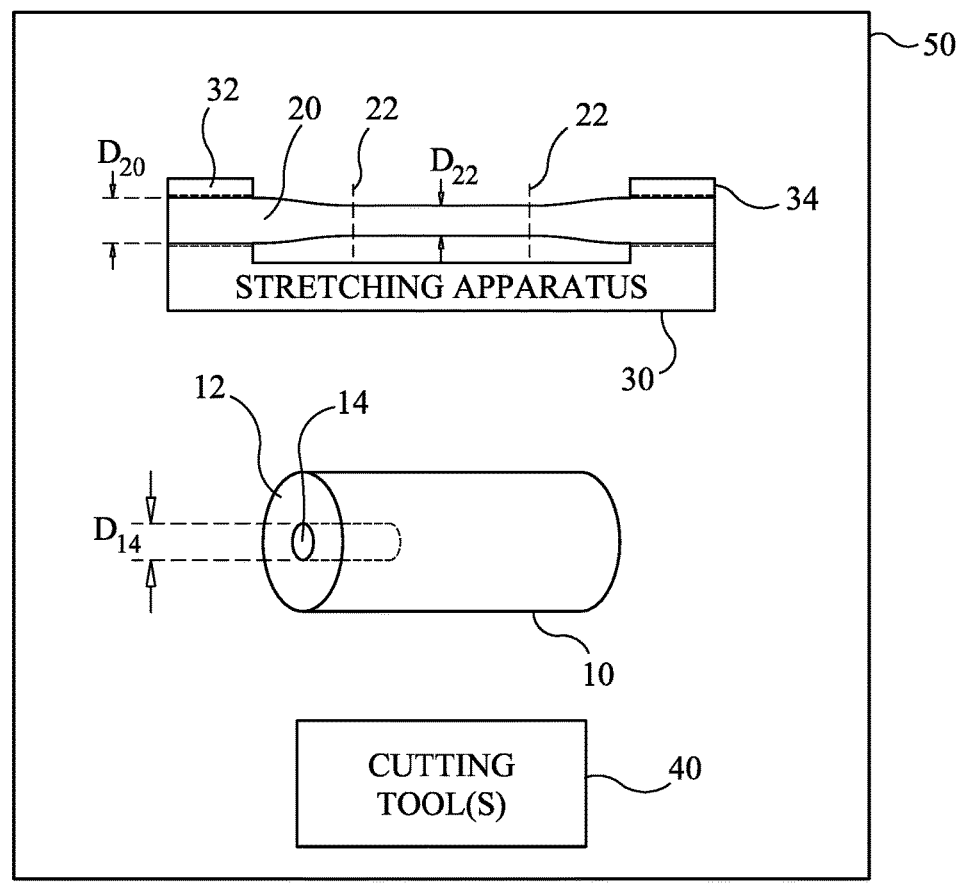
FIG. 3 is a schematic view of the stretched seal material, the valve element, and the cutting tool(s) immersed in a freezing environment in accordance with an embodiment of the present invention.

Referring now to FIG. 3, stretching apparatus 30 with seal material 20 to include reduced diameter portion 22 is immersed in freezing environment 50. Although not required, valve element 10 and/or cutting tool(s) 40 can also be immersed in freezing environment 50. Reduced diameter portion 22 remains immersed in freezing environment 50 until it freezes such that reduced diameter portion 22 remains fixed in this configuration for a brief period of time even after being removed from stretching apparatus 30. Once seal material 20 freezes, it can be cut such that at least a part of reduced diameter portion 22 is defined at one end of seal material 20. For example, while stretching apparatus 30 is in freezing environment 50, seal material 20 can be cut through reduced diameter portion 22 and then released from one of clamps 32 or 34. Such cutting can be performed using cutting tools 40. By placing tools 40 in freezing environment 50 prior to and during their use, the frozen state of reduced diameter portion 22 is maintained. The cut and now outboard end of reduced diameter portion 22 is placed in hole 14 either while valve element 10 is in freezing environment 50 (as shown in FIG. 4A), or immediately after valve element 10 is placed in a warmer environment, e.g., room temperature air (as shown in FIG. 4B). Since diameter $D_{22}$ of reduced portion 22 is less than diameter $D_{14}$ of hole 14, portion 22 fits easily into hole 14.

Valve element 10 with portion 22 in hole 14 begins to warm up when valve element 10 (shown in either FIG. 4A or FIG. 4B) is placed in an environment whose temperature is greater than that of freezing environment 50. During such warm up, the seal material returns to its free-state condition. Since the diameter $D_{20}$ of the seal material in its free-state condition is greater than the diameter $D_{14}$ of hole 14, the seal material will be constrained by the walls of hole 14 as the seal material's internal stresses relax. As a result, the seal material expands to fully fill hole 14. That is, the expanded seal has a diameter equal to that of hole 14 or $D_{14}$. Once the warming process is complete, any of the seal material extending beyond surface 12 can be trimmed flush with surface 12 resulting in an expanded seal 24 fully filling and constrained by hole 14 as shown in FIG. 5.

The advantages of the present invention are numerous. A valve seat is securely and permanently installed in a valve element without the need to swage the valve element's hole. The internal stresses of the relaxing seal material are sufficient to retain the material in a valve element. Since the internal stresses are released evenly during the warming process, the seal material is held in place by evenly distributed forces thereby minimizing any acute stress regions in the seal material.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of installing a valve seat, comprising the steps of:
   providing a valve element having a hole defined in a surface of said valve element, said hole having a hole diameter;
   providing a seal material having a freezing temperature;
   stretching said seal material wherein a portion thereof has a reduced diameter that is less than said hole diameter;
   immersing said portion of said seal material in a first environment having a temperature that is less than said freezing temperature of said seal material wherein said reduced diameter of said portion is fixed in said first environment;
   cutting through said portion in said first environment to thereby generate an outboard end of said portion;

placing said outboard end of said portion in said hole of said valve element wherein said portion extends from said hole of said valve element; and placing said valve element with said portion in said hole in a second environment having a temperature that is greater than said freezing temperature of said seal material.

2. A method of installing a valve seat, comprising the steps of:

providing a valve element having a hole defined in a surface of said valve element, said hole having a hole diameter;

providing a seal material having a freezing temperature;

stretching said seal material wherein a portion thereof has a reduced diameter that is less than said hole diameter;

immersing said portion of said seal material in a first environment having a temperature that is less than said freezing temperature of said seal material wherein said reduced diameter of said portion is fixed in said first environment;

placing said portion in said hole of said valve element;

placing said valve element with said portion in said hole in a second environment having a temperature that is greater than said freezing temperature of said seal material; and cutting, in said second environment, through said portion at said surface of said valve element.

3. A method according to claim 2, wherein said step of immersing includes the step of immersing said valve element in said first environment.

4. A method according to claim 3, wherein said step of placing said portion in said hole in said valve element occurs in said first environment.

5. A method according to claim 2, wherein said step of placing said portion in said hole in said valve element occurs in said second environment.

6. A method according to claim 2, wherein said hole diameter is smaller than a diameter of said seal material prior to said step of stretching.

7. A method according to claim 2, wherein said reduced diameter of said portion is smaller than said hole diameter and is in the range of approximately 35% to approximately 50% smaller than a diameter of said seal material prior to said step of stretching.

8. A method according to claim 2, wherein said hole diameter is approximately 25% smaller than a diameter of said seal material prior to said step of stretching, and wherein said reduced diameter of said portion is smaller than said hole diameter and is in the range of approximately 35% to approximately 50% smaller than said diameter of said seal material prior to said step of stretching.

9. A method according to claim 2, wherein said first environment comprises a bath of liquid nitrogen.

10. A method according to claim 2, wherein said seal material comprises an elastomeric material.

11. A method according to claim 2, wherein said step of stretching occurs in said second environment.

12. A method of installing a valve seat, comprising the steps of:

providing a rigid valve element having a hole defined in a surface of said rigid valve element, said hole having a hole diameter;

providing a cylindrical piece of elastomeric material having a freezing temperature;

stretching said cylindrical piece wherein a first portion of said cylindrical piece has a reduced diameter that is less than said hole diameter, and wherein a second portion of said cylindrical piece has a non-reduced diameter that is greater than said hole diameter;

immersing at least said first portion of said cylindrical piece in a liquid having a temperature that is less than said freezing temperature of said elastomeric material wherein said reduced diameter of said first portion is fixed in said liquid;

placing said first portion in said hole of said rigid valve element;

placing said rigid valve element with said first portion in said hole in an environment having a temperature that is greater than said freezing temperature of said elastomeric material; and cutting, in said environment having a temperature that is greater than said freezing temperature of said elastomeric material, through said first portion at said surface of said rigid valve element.

13. A method according to claim 12, wherein said step of immersing includes the step of immersing said rigid valve element in said liquid.

14. A method according to claim 13, wherein said step of placing said first portion in said hole in said rigid valve element occurs in said liquid.

15. A method according to claim 12, wherein said step of placing said first portion in said hole in said rigid valve element occurs in said environment having a temperature that is greater than said freezing temperature of said elastomeric material.

16. A method according to claim 12, wherein said hole diameter is approximately 25% smaller than said non-reduced diameter of said second portion.

17. A method according to claim 12, wherein said reduced diameter of said first portion is smaller than said hole diameter and is in the range of approximately 35% to approximately 50% smaller than said non-reduced diameter of said second portion.

18. A method according to claim 12, wherein said hole diameter is smaller than said non-reduced diameter of said second portion, and wherein said reduced diameter of said first portion is smaller than said hole diameter and is in the range of approximately 35% to approximately 50% smaller than said non-reduced diameter of said second portion.

19. A method according to claim 12, wherein said liquid comprises liquid nitrogen.

20. A method according to claim 12, wherein said step of stretching occurs in said environment having a temperature that is greater than said freezing temperature of said elastomeric material.

* * * * *